US009871564B1

(12) United States Patent
Gu et al.

(10) Patent No.: US 9,871,564 B1
(45) Date of Patent: Jan. 16, 2018

(54) NON-INVASIVE BEAM STEERING (71) Applicant: Google Inc., Mountain View, CA (US)

(72) Inventors: Changzhan Gu, Milpitas, CA (US);
Zhibin Zhang, Hayward, CA (US);
Tony Ong, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/372,576

(22) Filed: Dec. 8, 2016

(51) Int. Cl.
*H04B 7/04* (2017.01)
*H04W 4/04* (2009.01)
*H04B 7/06* (2006.01)
*H04B 5/00* (2006.01)
*H01Q 21/00* (2006.01)
*H04B 10/00* (2013.01)
*H04Q 11/00* (2006.01)
*H04B 10/114* (2013.01)
*H04B 7/0413* (2017.01)

(52) U.S. Cl.
CPC .......... *H04B 7/0421* (2013.01); *H01Q 21/00* (2013.01); *H04B 5/0037* (2013.01); *H04B 5/0081* (2013.01); *H04B 7/0617* (2013.01); *H04B 10/1149* (2013.01); *H04B 10/12* (2013.01); *H04Q 11/0066* (2013.01); *H04W 4/043* (2013.01); *H04B 7/0413* (2013.01)

(58) Field of Classification Search
CPC .. H04B 7/0421; H04B 5/0037; H04B 5/0081; H04B 7/0617; H04B 10/12; H04B 10/1149; H04B 7/0413; H01Q 21/00; H04Q 11/0066; H04W 4/043

See application file for complete search history.

(56) References Cited

U.S. PATENT DOCUMENTS

| 7,366,150 | B2 | 4/2008 | Lee et al. | |
| 7,378,817 | B2 | 5/2008 | Calhoon et al. | |
| 8,862,155 | B2* | 10/2014 | Stern | H04W 4/043 |
| | | | | 455/456.2 |
| 2002/0171897 | A1 | 11/2002 | Cho et al. | |
| 2006/0250308 | A1* | 11/2006 | Pinel | H01P 1/20327 |
| | | | | 343/700 MS |
| 2016/0099749 | A1 | 4/2016 | Bennett et al. | |
| 2016/0301474 | A1* | 10/2016 | Bourg | H04B 10/27 |

FOREIGN PATENT DOCUMENTS

| WO | WO-2002056508 A1 | 7/2002 |
| WO | WO-2003058850 A2 | 7/2003 |

* cited by examiner

*Primary Examiner* — Janice Tieu
(74) *Attorney, Agent, or Firm* — Honigman Miller Schwartz and Cohn LLP (57) ABSTRACT

A method includes receiving packets of data from an external network and receiving location information over a wireless communication link from a wireless communication device located inside a building. The location information indicates a relative location of the wireless communication device. The method also includes executing beam forming with the wireless communication device based on the received location information to form a communication beam directed toward the wireless communication device. The method also includes transmitting the communication beam over the wireless communication link from the external network interface unit to the wireless communication device, the communication beam containing the data packets.

26 Claims, 7 Drawing Sheets

NON-INVASIVE BEAM STEERING

TECHNICAL FIELD

This disclosure relates to non-invasive beam steering for providing communications between an exterior network and a residential network.

BACKGROUND

Fiber optic communication is an emerging method of transmitting information from a source (transmitter) to a destination (receiver) using optical fibers as the communication channel. A passive optical network (PON) generally includes an optical line terminal located at a service provider central office (e.g., a hub) and a number of optical network units or optical network terminals, near end users. These optical network units/terminals provide a residential network associated end user (e.g., subscriber) access to the PON and are typically located at a demarcation point between the residential network and the PON.

Generally, installation of a fiber optical communication system includes physically accessing buildings or premises of the subscribers. Such physical access may entail a technician entering the building, drilling holes through walls, installing and commissioning the fibers and hardware inside the premises, and so forth. Without such physical access, the installers are not able to deploy or maintain the infrastructure and enable the service subscription to the end user. The physical access requirements can lead to higher costs of deployment due to labor, less customer satisfaction, a slower deployment process, and health risks resulting from drilling holes through walls to feed the fibers/cables.

SUMMARY

One aspect of the disclosure provides a method for non-invasively establishing communication between an external network and a wireless communication device of a wireless network. The method includes receiving, at control hardware of an external network interface unit, packets of data from an external network and receiving, at the control hardware, location information over a wireless communication link from a wireless communication device inside the building. The external network interface unit is affixed to an external surface of a building. The location information indicates a relative location of the wireless communication device. The method also includes executing, by the control hardware, beam forming with the wireless communication device based on the received location information to form a communication beam directed toward the wireless communication device and transmitting the communication beam over the wireless communication link from the external network interface unit to the wireless communication device, the communication beam containing the data packets.

Implementations of the disclosure may include one or more of the following optional features. In some implementations, the method includes receiving, at the control hardware, inductive power from an interior charging device inductively coupled to the control hardware. The internal charging device may be located inside the building and include a transmit induction coil configured to generate an electromagnetic field for transmitting the inductive power through the external surface to the control hardware. The internal charging device may be electrically connected to an alternating current power source located inside the building and affixed to an interior surface of the building in a juxtaposed relationship with the external network interface unit.

In some examples, the external surface of the building includes an external side of one of a window, a wall, a door, or a facade and the internal surface of the building includes an interior side of a corresponding one of the window, the wall, the door, or the facade. The control hardware of the external network interface unit may include a power circuitry including a receive induction coil configured to receive the inductive power transmitted over the electromagnetic field by the transmit induction coil of the internal charging device. The control hardware may also include a rectifier configured to convert the inductive power into direct current power for powering components of the external network interface unit and/or powering customer premises equipment located outside the building.

Receiving the data packets from the external network may include the data packets from an external transceiver device in communication with the control hardware and located outside the building at a demarcation point between the building and the external network. The external transceiver device may be configured to route the data packets from the external hardware to the control hardware. The external transceiver device may include an optical network unit configured to receive downstream optical signals routing the data packets from an optical line terminal of the external network and convert the upstream optical signals into electrical signals for communication to the external network interface unit.

In some examples, the optical network unit receives the optical signals through a fiber optic line terminating at the optical network unit. The optical network unit may also receive the downstream optical signals via a free space optical beam from a free space optical terminal at an established fiber point of presence site of the external network. The external transceiver device may communicate with the external network interface unit through a cable connected to the external transceiver device and the external network interface unit. The cable may be configured to route the data packets from the external transceiver device to the external network interface unit. The cable may be further configured to provide direct current power from the external network interface unit to the external transceiver device.

In some implementations, executing beam forming with the wireless communication device includes transmitting sounding frames through the external surface of the building from the control hardware to the wireless communication device and receiving the location information comprising the feedback matrix from the wireless communication device. The wireless communication device may be configured to build a feedback matrix in response to receiving the sounding frames. Executing beam forming with the wireless communication device may also include determining the relative position of the wireless communication device based on the received feedback matrix and steering a directivity of the communication beam toward the relative position of the wireless communication device. The external network interface unit may include a multiple-input multiple-output antenna array arranged in a 4×4 configuration. The external network interface unit may include multiple-input multiple-output antenna array arranged in a 2×2 configuration.

Another aspect of the disclosure provides a system for non-invasively establishing communication between an external network and a wireless communication device of a wireless network. The system includes an external transceiver device and an external network interface unit in communication with the external transceiver device. The external transceiver device is located at a demarcation point between an external network and a building. The external network interface unit is affixed to an exterior surface of the building and including control hardware and memory hardware in communication with the control hardware. The memory hardware stores instructions that when executed on the control hardware cause the control hardware to perform operations. The operations include receiving packets of data from an external network and receiving location information over a wireless communication link from a wireless communication device inside the building. The location information indicates a relative location of the wireless communication device. The operations also include executing beam forming with the wireless communication device based on the received location information to form a communication beam directed toward the wireless communication device and transmitting the communication beam over the wireless communication link from the external network interface unit to the wireless communication device, the communication beam containing the data packets.

This aspect may include one or more of the following optional features. In some implementations, the operations include receiving inductive power from an interior charging device inductively coupled to the control hardware. The internal charging device may be located inside the building and including a transmit induction coil configured to generate an electromagnetic field for transmitting the inductive power through the external surface to the control hardware. The internal charging device may be electrically connected to an alternating current power source located inside the building and affixed to an interior surface of the building in a juxtaposed relationship with the external network interface unit.

The external surface of the building may include an external side of one of a window, a wall, a door, or a facade and the internal surface of the building may include an interior side of a corresponding one of the window, the wall, the door, or the facade. The control hardware of the external network interface unit may include power circuitry including a receive induction coil configured to receive the inductive power transmitted over the electromagnetic field by the transmit induction coil of the internal charging device and a rectifier configured to convert the inductive power into direct current power for powering components of the external network interface unit and/or powering customer premises equipment located outside the building.

Receiving the data packets from the external network may include receiving the data packets from the external transceiver device. The external transceiver device may be configured to route the data packets from the external network to the control hardware. The external transceiver device may also include an optical network unit configured to receive downstream optical signals routing the data packets from an optical line terminal of the external network and convert the upstream optical signals into electrical signals for communication to the external network interface unit.

In some examples, the optical network unit receives the optical signals through a fiber optic line terminating at the optical network unit. The optical network unit may also receive the downstream optical signals via a free space optical beam from a free space optical terminal at an established fiber point of presence site of the external network. The external transceiver device may communicate with the external network interface unit through a cable connected to the external transceiver device and the external network interface unit. The cable may be configured to route the data packets from the external transceiver device to the external network interface unit. The cable may be further configured to provide direct current power from the external network interface unit to the external transceiver device.

In some implementations, executing beam forming with the wireless communication device includes transmitting sounding frames through the external surface of the building from the control hardware to the wireless communication device and receiving the location information comprising the built matrix data from the wireless communication device. The wireless communication device may be configured to build matrix data in response to receiving the sounding frames. Executing beam forming with the wireless communication device may also include determining the relative position of the wireless communication device based on the received matrix data and steering a directivity of the communication beam toward the relative position of the wireless communication device. The external network interface unit may include a multiple-input multiple-output antenna array arranged in a 4×4 configuration. The external network interface unit may also include a multiple-input multiple-output antenna array arranged in a 2×2 configuration.

The details of one or more implementations of the disclosure are set forth in the accompanying drawings and the description below. Other aspects, features, and advantages will be apparent from the description and drawings, and from the claims.

DETAILED DESCRIPTION

Deploying fiber-to-the-home (FTTH) infrastructures generally require a technician to gain physical access to a building of a subscriber, which may include, without limitation, a house, apartment, or multi-dwelling unit (MDU). For instance, the technician may need to install hardware inside the premises as well as drill holes through building walls to commission fibers to connect the hardware to the optical network. Implementations herein alleviate the physical access requirement by allowing the subscriber to self-install an external network interface unit to an exterior surface (e.g., window) of a subscriber's building for providing a residential network access to an external network. Once the external network interface unit is affixed to the external surface of the building, the external network interface unit may wireless transmit communication beams containing content from the external network to one or more wireless communication devices (e.g., routers) within a residential network. Additionally, optical network units at the customer premises may also be installed outside the premises. While external power sources (e.g., a weatherproof 120 VAC outlet) may provide power for operating optical network units outside the customer premises, external power sources are not always present, or may be inconveniently located and therefore require the use of long cable runs to provide power thereto. Accordingly, implementations herein may include the external network interface unit receiving inductive power form a charging device located inside the building and providing direct current power for powering components of the optical network unit as well as components (e.g., antenna array) of the external network interface unit.

Figure 1A:
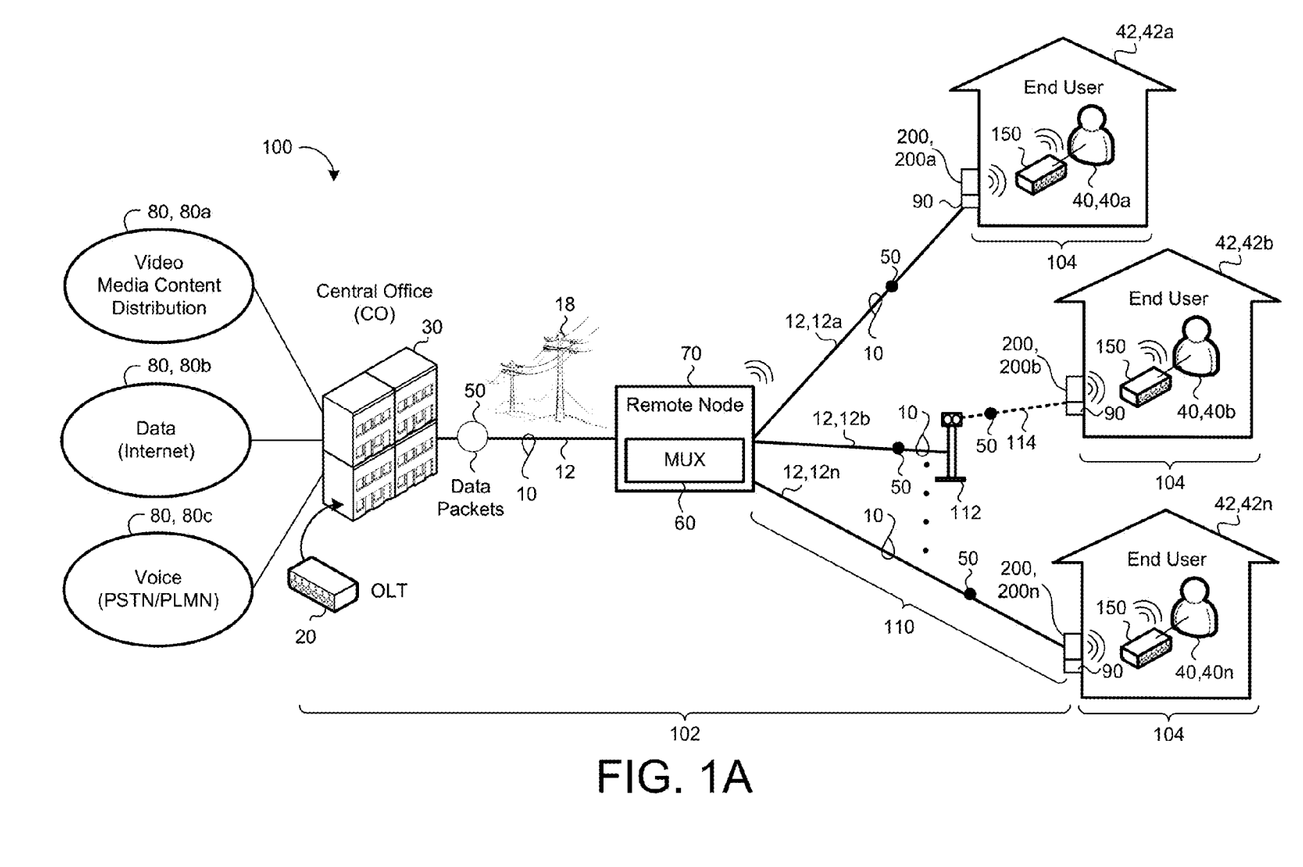
FIGS. 1A and 1B are schematic views of an example network system.
Figure 1B:
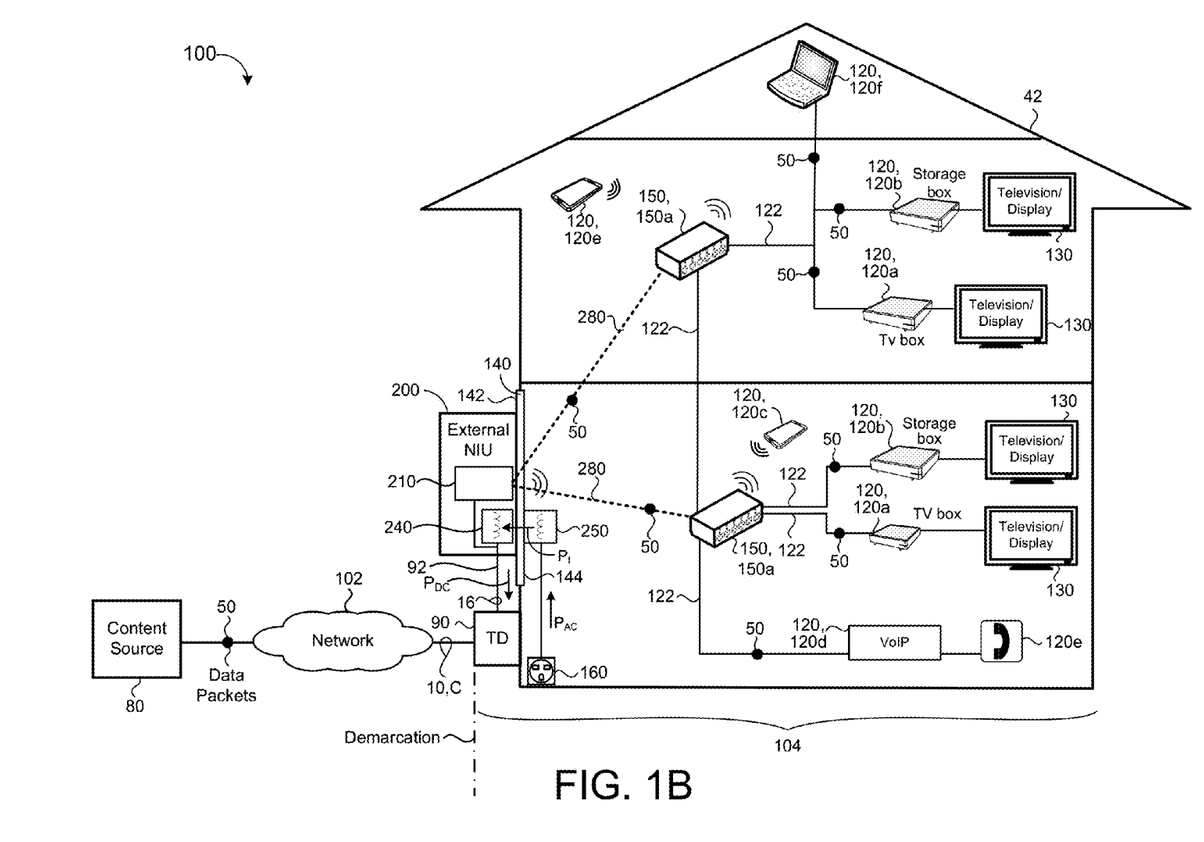

Referring to FIGS. 1A and 1B, in some implementations, a network system 100 includes an access network 102 in communication with one or more residential networks 104. The access network 102 delivers communication signals 10 (e.g., optical signals) through communication links 12, 12a-n (e.g., optical fibers or line-of-sight free space optical communications) between an optical line terminal (OLT) 20 housed in a central office (CO) 30 to one or more residential networks 104 each associated with a user 40, 40a-n (also referred to as a customer) at a corresponding customer premises 42, 42a-n (e.g., house, building, or structure). The network system 100 may be associated with an optical fiber-to-the-home (FTTH), fiber-to-the-building (FTTB), fiber-to-the-node (FTTN), fiber-to-the-curb (FTTC), fiber-to-the-premises (FTTP), or simply FTTX system for delivering high speed, high bandwidth services for data 50 (e.g., as data packets).

The access network 102 may be an optical network (e.g., a passive optical network (PON) or a Gigabit-capable PON (GPON)) from the OLT 20. The PON 102 may implement a point-to-point or a point-to-multi-point network architecture that uses multiplexer/demultiplexer (MUX) 60 at a remote node 70 to enable a single optical fiber feeder 12 to serve multiple users 40 (e.g. 16-128). Although the optical network 102 is described with respect to a PON, an active optical network (AON) may be used as well.

The optical network 102 provides the optical fibers 12 for sending data packets 50 from the CO 30 that includes the OLT 20 (e.g., having at least one optical transmitter/receiver or transceiver) to a number of external transceiver devices (TDs) 90. The OLT 20 may be external to the CO 30, where the CO 30 feeds the OLT 20 using dedicated fiber runs. In some examples, the external TDs 90 are optical network units/terminals (ONUs). The CO 30 receives data 50 from a content source 80, such as video media distribution 80a, internet data source 80b, and voice data source 80c, that may be transferred as data packets 50 to the end users 40.

The examples show the OLT 20 as the endpoint of the optical network 102 by converting electrical signals used by equipment of a service provider to/from fiber-optic signals 10 used by the optical network 102. In addition, the OLT 20 coordinates multiplexing between conversion devices at the user end 40. The OLT 20 sends the optical signal 10 through a feeder fiber 12 to the remote node 70, which multiplexes/demultiplexes the optical signal 10, via the MUX 60, for distribution between the OLT 20 and the external TDs 90 associated with the end users 40, 40a-n. In some implementations, power lines 18, such as 110 VAC electric lines or from commonly available Cable Television (CATV) power supply lines, route the optical fibers 12 and provide power.

In some examples, the optical fiber 12 providing a last-run portion 110, also known as the "last mile" (e.g., curb-to-home) or last-run link, may include a free space optical (FSO) terminal 112 at an established fiber point-of-presence (POP) site for wirelessly distributing the data packets 50 to the customer premises 42. For instance, the FSO terminal 112 may receive the optical signal 10 via the corresponding optical fiber 12b from the OLT 20 and transmit an FSO beam 114 containing the data packets to the external TD 90 at the premises 42. In some examples, the FSO terminal 112 uses multi-Gigabit connectivity to transmit/receive FSO beams 114 to and from the corresponding TD 90. Under these scenarios, the external TD 90 includes one or more antennas capable of operating in a receive mode for receiving the FSO beam 114 from the FSO terminal 112.

Each external TD 90 may include an optical transmitter/receiver (i.e., transceiver) for transmitting and receiving data packets 50 from the OLT 20. The external TD 90 may be a media converter that converts optical signals 10 to electric signals 16 for communication over copper wires (e.g. Ethernet lines), such as cable 92 connecting the external TD 90 to an external network interface unit (NIU) 200, 200a-n. Each premises or building 42 includes a corresponding external NIU 200 affixed to a surface 140 (FIG. 1B) outside the building 42, such as a window, wall, door, or facade, and configured to wirelessly transmit the data packets 50 through the surface 140 of the building 42 to one or more internal wireless communication devices (WCDs) 150 of the residential network 104 located inside the building 42. Accordingly, the external TD 90 may convert an optical signal 10 routing the packets 50 of data received from the OLT 20 (over the PON 102) into an electrical signal 16, such as an Ethernet signal, and provide the electrical signal 16 to the external NIU 200 (e.g., via cable 92) to wirelessly transmit the data packets 50 through the residential network 104 associated with the end user 40.

Customer premises equipment (CPE) is any terminal and associated equipment located at the premises (e.g., building) 42 of the user 40 and connected to a carrier telecommunication channel C at a demarcation point. In the examples shown, the external TD 90, the external NIU 200, and the internal WCD 150 are CPEs. The demarcation point is established at a house, building, or complex to separate the customer equipment from the service provider equipment. CPE generally refers to devices such as telephones, routers, switches, residential gateways (RG), set-top boxes, fixed mobile convergence products, home networking adapters, or Internet access gateways that enable the user 40 to access services of a communications service provider and distribute them around the building 42 of the user 40 via the residential network 104.

In some examples, the WCD 150 of the residential network 104 includes a network box equipped with multiple Internet protocol (IP) interfaces. Each building 42 may include one or more WCDs 150 each acting as an access point (e.g., wireless or wired connection) for the residential network 104, for example, by offering Wireless Fidelity (Wi-Fi) connectivity (e.g., wireless communication links 280 (FIG. 1B)) to the residential network 104 and/or by offering multiple wired connections 122 (FIG. 1B) capable of establishing connections with electronic devices 120. Therefore, the WCD 150 (e.g., network box) serves as a router to provide internet service to the devices 120 located within the premises 42 (e.g., building, house, office, etc.).

The external NIU 200 serves as a wireless bridge between the external TD 90 outside the building 42 and the WCD 150 located within the building 42 of the user 40. Specifically, the external NIU 200 is configured to execute beam forming with one or more WCDs 150 located within the building 42 to form a communication beam 380 (FIG. 3B) directed toward each corresponding WCD 150 for transmitting the data packets 50 thereto. Each WCD 150 may serve as a node within the residential network 104 for routing the data packets 50 to a target electronic device 120 directly or via one or more hops between the external NIU 200 and the target electronic device 120. The external NIU 200 includes transceiver circuitry 210 (FIG. 1B) configured to operate in a transmit mode for wirelessly transmitting/receiving the data packets 50 to and from the WCD(s) 150 through the surface 140 of the building 42. In some examples, the transceiver circuitry 210 includes a multiple-input multiple-output (MIMO) circuitry for transmitting/receiving data to and from the WCD 150.

Without the external NIU 200, the external TD 90 would have to physically connect to the WCD 150 located within the premises 42 or an ONU replacing the external TD 90 would need to be installed inside the premises 42 for connecting to the WCD 150. Under either scenario, physical access to the premises 42 is required for deploying fiber-to-the-home FTTH, i.e., connecting the residential network 104 to the external network 102 (e.g., optical access network). Such physical access includes, without limitation, a technician entering the premises or building 42 of the user 40 (e.g., subscriber), drilling holes through building walls and doors, and installing and commissioning the fibers to connect with the CPE. Accordingly, the external NIU 200 alleviates the need to physically access the building 42 by allowing the user 40 to instead affix the NIU 200 to the exterior surface 142 of the building 42 and connect (e.g., via cable 92) the NIU 200 to an ONU (e.g., external TD 90) installed outside the building 42. In doing so, the external ONU 90 may receive and convert the optical signal 10 from the optical network 102 into the electrical signal 16 and provide the electrical signal 16 via cable 92 to the external NIU 200 to wirelessly transmit the data packets 50 through the surface 140 to the WCD 150 located inside the building 42. Moreover, as the WCD 150 wirelessly connects to the optical network 102 via the external NIU 200, the WCD 150 does not require a physical connection to the ONU 90, and therefore, may be positioned at any desirable location within the building 42.

In some implementations, the residential network 104 uses standard communications technologies and/or protocols. Thus, the network 104 can include links using technologies, such as Ethernet, Wireless Fidelity (Wi-Fi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 104 can use custom and/or dedicated data communications technologies instead of, or in addition to, the ones described above.

In some implementations, the residential network 104 is a local area network (LAN) (e.g., a home area network (HAN)) that facilitates communication and interoperability among the external NIU 200, one or more internal WCDs 150, 150a-b, and electronic devices 120 within a limited area 32 (e.g., building), such as a home, school, or office of the user 40. An electronic device 120 may be a TV box 120a, a storage box 120b, a tablet 120c, a voice-over-internet protocol (VoIP) device 120d, a phone or smartphone 120e, a computer 120f (or a laptop, a portable electronic device), etc., each of which may be a wireless connection 280 or a wired connection 122 to an internal WCD 150. The wireless connection 280, also referred to as wireless communication link 280, may include a wireless interface, such as an RG-45 Ethernet interface for 802.11 Wireless Fidelity (Wi-Fi). On the other hand wired connection 122 may include a coaxial interface, such as an RJ-45 interface.

Figure 2A:
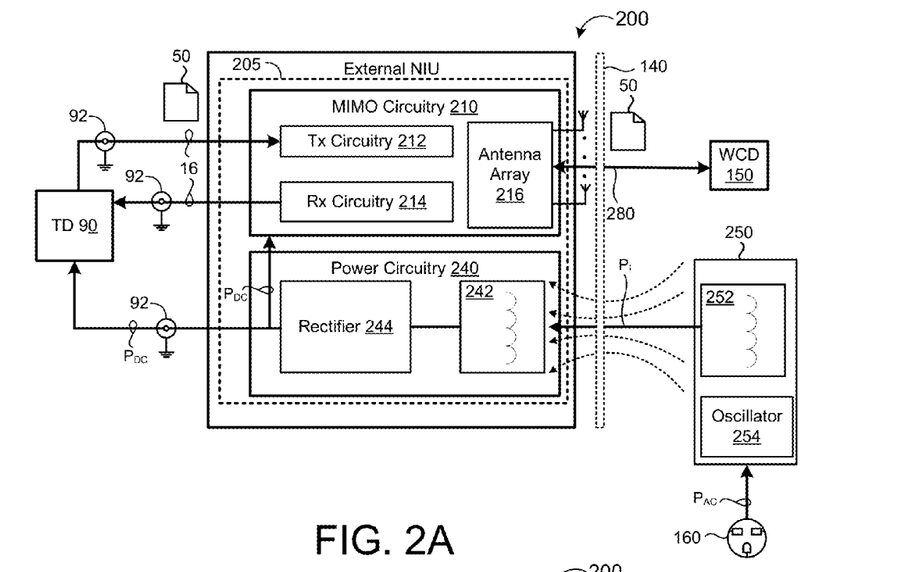
FIG. 2A is a schematic view of an example network interface unit of the network system of FIGS. 1A and 1B.

Referring to FIGS. 1B and 2A, in some implementations, the external NIU 200 affixes to an external side 142 of the surface 140 of the building 42. The surface 140 also includes an interior side 144 disposed on an opposite side of the surface 140 than the external side 142 and opposing the interior of the building 42. The external side 142 may be referred to as an external surface 142 and the interior side 144 may be referred to as an interior surface 144. In the example shown, the surface 140 includes a window and the external NIU 200 affixes to the external side 142 of the window 140 via a combination of one or more of adhesives, suction, magnets, or other attachment techniques. The external NIU 200 may affix to a corner of the window 140 to not obstruct a view through the window and/or decrease aesthetic properties of the building 42. In other configurations, the surface 140 includes a wall, door, or facade separating the interior of the building 42 from the outside.

The external NIU 200 includes control hardware 205 including the transceiver circuitry 210 and power circuitry 240. The control hardware 205 may include additional components such as, but not limited to, switches, processor(s), controllers, etc. The transceiver circuitry 210 may include MIMO-based circuitry 210 having transmit circuitry (Tx Circuitry) 212, receive circuitry (Rx circuitry) 214, and an antenna array 216 for wirelessly transmitting/receiving data packets 50 through the surface 140 to and from the WCD 150. The Tx circuitry 212 is configured to receive the electrical signal 16 containing the data packets 50 converted by the external TD 90. For instance, the cable 92 (e.g., Ethernet cable) may include a first end connected to the external TD 90 and a second end connected to the Tx circuitry 212 for transferring the electrical signal 16 containing the data packets 50. Thereafter, the Tx circuitry 212 may enable the antenna array 216 in a transmit mode to wirelessly propagate the high speed stream of data 50 through the surface 140 (e.g., window) of the building 42 to the WCD 150 over the wireless communication link 280 using advanced Wi-Fi technology.

On the other hand, the Rx circuitry 214 may enable the antenna array 216 in a receive mode to receive data 50 through the surface 140 from the WCD 150 over the wireless communication link 280. The Rx circuitry 214 may then route the data 50 in a corresponding electrical signal 16 to the TD 90 via the cable 92. The TD 90 may convert the electrical signal 16 to an optical signal 10 for transmission through the optical network 102 to the OLT 20.

In some implementations, the antenna array 216 of the MIMO circuitry 210 implements a 4×4 configuration for transmitting the data packets 50 to the WCD 150 over the five (5) Gigahertz (GHz) band. The 4×4 MIMO configuration may deliver the data packets 50 at the Gigabit level. Additionally or alternatively, the antenna array 216 may implement a 2×2 configuration for transmitting the data packets 50 over the 2 GHz band. While the 5 GHz band generally provides higher throughput for transmitting the data 50 to the WCD 150 at high speeds, the 2 GHz band may allow for the delivery of data 50 over longer distances within the building 42. Moreover, the MIMO circuitry 210 may execute a beam forming procedure (FIGS. 3A and 3B) with the WCD 150 to effectively steer communication beams 380 across the wireless communication link 280 in a direction toward the WCD 150. For instance, the MIMO circuitry 210 may control the level of radiation output from the antenna array 216 to steer the communication beam 380 in a desirable direction, i.e., toward a relative location of the WCD 150 within the building 42. The use of beam forming advantageously allows the WCD 150 (e.g., network box) to be placed in a wide range of locations within the building 42, thereby providing the user 40 with more freedom on where to position the WCD(s) 150 within the building 42.

The customer premises equipment (CPE) including the external TD 90 and the external NIU 200 need to connect to a power source (e.g., a 120 Volt Alternating Current (VAC)) for powering components associated with the CPE. For instance, power is required for energizing the antenna array 216 during the transmit mode and the receive mode. In some examples, the external TD 90 and/or the external NIU 200 connect to an external power source (e.g., a weatherproof 120 VAC outlet). However, external power sources are often absent, or are inconveniently located and therefore require the use of long cable runs to provide power to the CPEs 90, 200.

With continued reference to FIGS. 1B and 2A, in some implementations, the power circuitry 240 is configured to receive power wirelessly from an internal charging device 250 located inside the building 42 for powering components, such as the antenna array 216 of the MIMO circuitry 210, and/or components at the external TD 90, such as a media converter and/or associated antenna(s). In some examples, the power circuitry 240 is inductively coupled to the internal charging device 250 and receives inductive power $P_I$ through the surface 140 (e.g., window) of the building 42 from the internal charging device 250. For instance, the charging device 250 may include a transmit induction coil 252 configured to generate an electromagnetic field for transmitting the inductive power $P_I$ through the surface 140 of the building, while the power circuitry 240 at the external NIU 200 may include a receive induction coil 242 configured to receive the inductive power $P_I$. In some implementations, the charging device 250 is electrically connected to an alternating current (AC) power source 160 (e.g., a 120 VAC wall outlet) located inside the building 42. The charging device 250 may receive AC power $P_{AC}$ from the AC power source 160 and use an oscillator 254 to convert the $P_{AC}$ to desirable high-frequency waves for use by the transmit induction coil 252 when transmitting the inductive power $P_I$ through the surface 140 to the receive induction coil 242.

In some examples, the internal charging device 250 is affixed to the interior surface 144 of the building 42 in a juxtaposed relationship with the external NIU 200 affixed to the exterior surface 142 of the building 42. In the example shown in FIG. 1B, the surface 140 includes the window and the internal charging device 250 affixes to the internal side 144 of the window 140 via a combination of one or more of adhesives, suction, magnets, or other attachment techniques. As with the external NIU 200 affixed to the exterior side 142 of the window 140, the charging device 250 may affix to the same corner of the window 140 on the interior side 144 to not obstruct a view through the window and/or decrease aesthetic properties of the building 42. Affixing the external NIU 200 and the charging device 250 to opposite sides 142 and 144 of the surface 140 in the juxtaposed relationships permits the NIU 200 and the charging device 250 to inductively couple to one another for transferring the inductive power $P_I$ through the surface 140 from the charging device 250 to the NIU 200. Moreover, the subscribing end user 40 may install the charging device 250 by simply affixing the device 250 to the interior surface 144 of the building 42 and connecting the charging device 250 to the power source 160.

The power circuitry 240 at the external NIU may further include a rectifier 244 configured to convert the inductive power $P_I$ received by the receive induction coil 242 to direct current power $P_{DC}$. The direct current power $P_{DC}$ may energize the receive induction coil 242. In some examples, the power circuitry 240 provides the direct current power $P_{DC}$ to the MIMO circuitry 210 for energizing the antenna array 216 during the transmit and receive modes. Additionally or alternatively, the power circuitry 240 may provide direct current power $P_{DC}$ to the external TD 90 for powering components thereof. For instance, the external TD 90 may implement the media converter requiring power for converting optical signals 14 received from the external network 102 to electric signals 16 for use by the external NIU 200. In some examples, the power circuitry 240 routes the direct current power $P_{DC}$ through the same cable 92 (e.g., Ethernet cable) used for transferring the electric signal 16. For instance, the cable 92 may be configured for power-over-Ethernet (PoE), such that direct current power $P_{DC}$ and electrical signals 16 containing packets 50 of data may both pass through the cable 92.

Figure 2B:
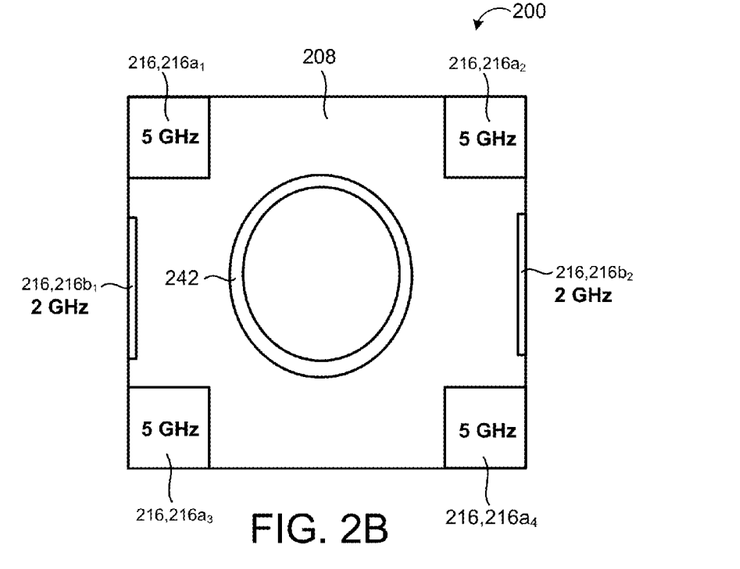
FIG. 2B is a schematic view of an example network interface unit of the network system of FIGS. 1A and 1B including an induction coil and an antenna array arranged on a printed circuit board.

Referring to FIG. 2B, in some implementations, the antenna array 216 and the receive induction coil 242 of the external NIU 200 are arranged on a printed circuit board (PCB) 208. The PCB 208 may be rectangular-shaped. In some examples, the PCB 208 defines a length and a width substantially equal to one another. For instance, the length and the width may each be about six (6) inches or 152 millimeters (mm). In the example shown, the antenna array 216 includes four 5 GHz antennas $216a_1$, $216a_2$, $216a_3$, $216a_4$ and two 2 GHz antennas $216b_1$, $216b_2$. Each 5 GHz antenna $216a_1$-$216a_4$ may be placed at a corresponding corner of the PCB 208 and define a substantially rectangular shape. For instance, 5 GHz antenna $216a_1$-$216a_4$ may include a length equal to about 20 mm and a width equal to about 20 mm. The 2 GHz antennas $216b_1$, $216b_2$ be disposed on opposite sides of the PCB 208.

In one example, the external NIU 200 implements a 5 GHz BW80 radio that wirelessly propagates the electrical signals 16 (e.g., Wi-Fi signals) through the surface 140 at a power level equal to 18 decibel-milliwatts (dBm). The antenna array 216 includes four (4) narrow band (~800 Mbps) patch antennas. The surface 140 includes a single pane of glass and the WCD 150 is located within the building 42 about eight (8) meters away from the external NIU 200. Table 1 provides experimental data containing measurements of transfer rate and bandwidth of the data 50 contained in the electrical signals 16 through the glass surface 140 over a plurality of consecutive five (5) second time intervals.

TABLE 1

| Interval | Transfer | Bandwidth |
| --- | --- | --- |
| 0.0-5.0 sec | 510 MBytes | 856 Mbits/sec |
| 5.0-10.0 sec | 405 MBytes | 679 Mbits/sec |
| 10.0-15.0 sec | 471 MBytes | 790 Mbits/sec |
| 15.0-20.0 sec | 508 MBytes | 852 Mbits/sec |
| 20.0-25.0 sec | 522 MBytes | 876 Mbits/sec |
| 25.0-30.0 sec | 486 MBytes | 816 Mbits/sec |
| 30.0-35.0 sec | 494 MBytes | 829 Mbits/sec |
| 35.0-40.0 sec | 519 MBytes | 871 Mbits/sec |
| 40.0-45.0 sec | 484 MBytes | 812 Mbits/sec |
| 45.0-50.0 sec | 462 MBytes | 776 Mbits/sec |
| 50.0-55.0 sec | 460 MBytes | 772 Mbits/sec |
| 55.0-60.0 sec | 434 MBytes | 728 Mbits/sec |
| 60.0-65.0 sec | 496 MBytes | 832 Mbits/sec |
| 65.0-70.0 sec | 502 MBytes | 843 Mbits/sec |
| 70.0-75.0 sec | 504 MBytes | 845 Mbits/sec |
| 75.0-80.0 sec | 518 MBytes | 869 Mbits/sec |
| 80.0-85.0 sec | 420 MBytes | 704 Mbits/sec |
| 85.0-90.0 sec | 483 MBytes | 811 Mbits/sec |
| 90.0-95.0 sec | 478 MBytes | 801 Mbits/sec |
| 95.0-100.0 sec | 493 MBytes | 827 Mbits/sec |
| 100.0-105.0 sec | 518 MBytes | 870 Mbits/sec |
| 105.0-110.0 sec | 481 MBytes | 807 Mbits/sec |
| 110.0-115.0 sec | 478 MBytes | 802 Mbits/sec |
| 115.0-120.0 sec | 502 MBytes | 842 Mbits/sec |
| 0.0-120.0 sec | 11.4 GBytes | 813 Mbits/sec |

Figure 3A:
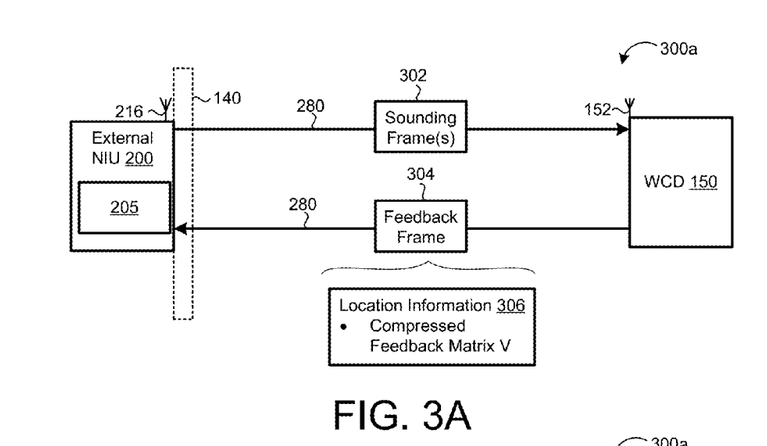
FIG. 3A is a schematic view of an example external network interface unit transmitting a sounding frame to a wireless communication device and the wireless communication device transmitting a feedback frame to the external network interface unit.
Figure 3B:
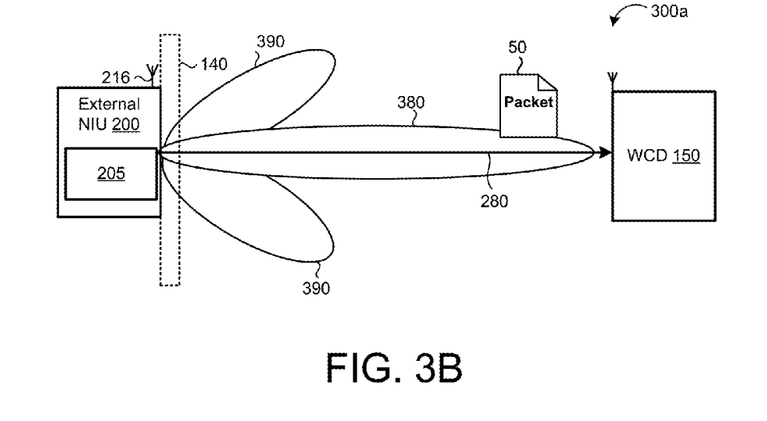
FIG. 3B is a schematic view of an example external network interface unit transmitting a communication beam directed toward a relative location of a wireless communication device.

Referring to FIGS. 3A and 3B, in some implementations, the external NIU 200 executes beam forming with the WCD 150 (FIG. 3A) to form a communication beam 380 (FIG. 3B) directed toward the WCD 150. In some examples, the MIMO circuitry 210 at the external NIU 200 uses single-user MIMO (SU-MIMO) beam forming configured to transmit/receive data packets 50 to and from a single WCD 150 at a time. In other examples, the MIMO circuitry 210 uses multiple-user MIMO (MU-MIMO) beam forming configured to transmit/receive data packets 50 to and from multiple WCDs 150 within the building 42 in spatially diverse locations/positions.

Schematic view 300a of FIG. 3A shows the control hardware 205 of the external NIU 200 executing beam forming with the WCD 150 by transmitting one or more sounding frames 302 over the wireless communication link 280 to the WCD 150. The WCD 150 includes one or more antennas 152 for communicating with the external NIU 200, as well as with electronic devices 120 and/or other WCDs 150 within the residential network 104. The sounding frames 302 may include an initial Null Data Packet Announcement frame for use in identifying the WCD 150. The sounding frame 302 also includes a null data packet (NDP), that when received by the WCD 150, causes the WCD 150 to build a feedback matrix V. For instance, the NDP within the received sounding frame 302 may include orthogonal frequency-division multiplexing (ODFM) training fields that the WCD 150 may use to build the feedback matrix V. The feedback matrix V includes location information 306 indicating a relative location of the WCD 150 within the building 42. When the external NIU 200 uses MU-MIMO beam forming, the external NIU 200 may transmit multiple NDPs in sounding frames 302 to each spatially diverse WCD 150 within the building.

After building the feedback matrix V, the WCD 150 transmits a feedback frame 304 received by the external NIU 200 and including the location information 306 associated with the WCD 150. The location information 306 may include the compressed feedback matrix V built by the WCD 150 in response to receiving the corresponding sounding frame 302. When the external NIU 200 uses MU-MIMO beam forming, the external NIU 200 may receive feedback frames 304 from each of the spatially diverse WCDs 150 within the building 42 that received a corresponding sounding frame 302. In response to receiving the feedback frame 304 from the WCD 150, the control hardware 205 of the external NIU 200 uses the feedback matrix V to determine the relative location of the WCD 150 within the building 42. In some examples, the control hardware 205 of the NIU 200 calculates a steering matrix Q for directing the communication beam 380 toward the WCD 150.

Referring to FIG. 3B, schematic view 300b shows the external NIU 200 steering a directivity of the communication beam 380 toward the relative position of the WCD 150. The control hardware 205 of the external NIU 200 may use the steering matrix Q for steering the directivity of the communication beam 380 toward the relative position of the WCD 150. In the example shown, the external NIU 200 transmits the communication beam 380 over the wireless communication 280 and through the surface of the building 42 to the WCD 150 located therein. The communication beam 380 contains the data packets 50 received from the external network 102 (e.g., PON 102). In some examples, the control hardware 205 of the external NIU 200 steers the directivity of the communication beam 380 by directing radio frequency (RF) energy (e.g., radiation) output from the antennas of the antenna array 216 toward the relative location of the WCD 150 within the building 42. For instance, the communication beam 380 directed toward the WCD 150 may be associated with a peak beam (e.g., main lobe) while one or more null beams 390 (e.g., side lobes) may be controlled to cancel out. When the external NIU 200 uses MU-MIMO beam forming, the external NIU 200 may form multiple communication beams 380 each directed/steered toward the corresponding relative position of each WCD 150 within the building 42 and transmit the communication beams 380 simultaneously.

Figure 4A:
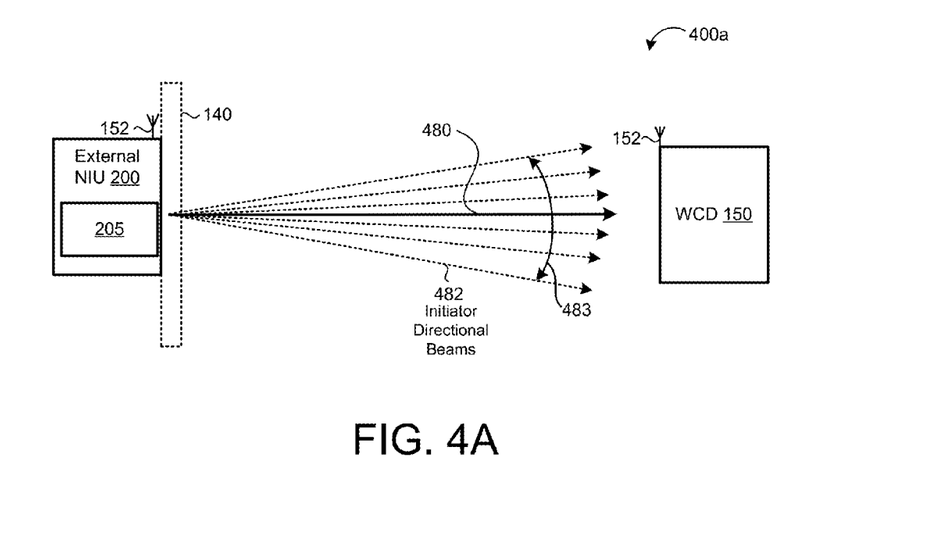
FIG. 4A is a schematic view of an example external network interface unit transmitting initiator directional beams during a transmitting sector level sweep across a initiator transmitting scan range.

In some configurations, the external NIU 200 and the one or more WCDs 150 within the building include IEEE 802.11ac/ad wireless chipsets enabling the NIU 200 and the WCD 150 to transmit/receive directional beams 480, 490 containing the data packets 50. Referring to FIG. 4A, the external NIU 200 executes beam forming with the WCD 150 by executing an initiator transmitting sector level sweep (T-SLS) to transmit a plurality of initiator directional beams. The initiator directional beams 482 transmitted during the initiator T-SLS may determine an optimal initiator beam vector 480 received by the WCD 150 during the initiator T-SLS. For instance, the WCD 150 may monitor the throughput data rate of each initiator directional beam 482 and determine the optimal initiator beam vector 480 as the initiator directional beam 482 associated with the highest throughput data rate. In some examples, the WCD 150 executes a receiver sector level sweep (R-SLS) during the initiator T-SLS to capture one or more of the initiator directional beams 482 from the external NIU 200.

Figure 4B:
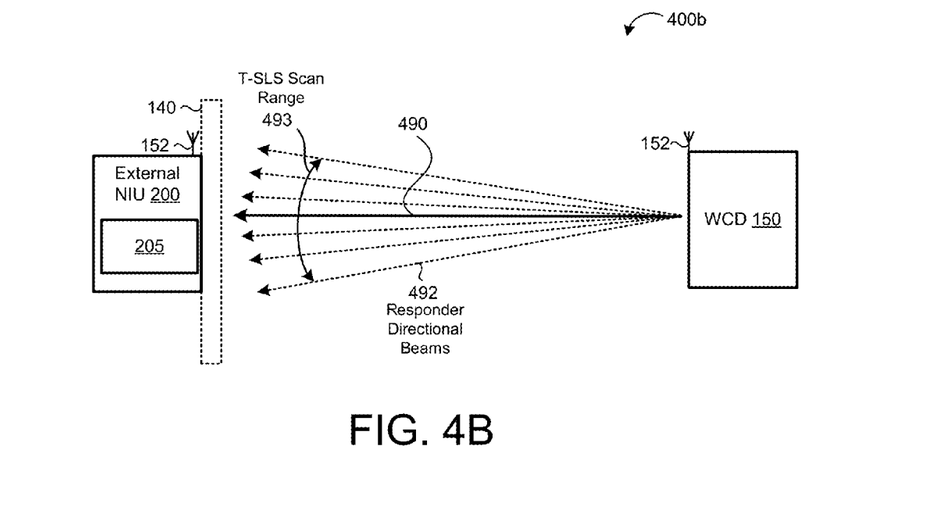
FIG. 4B is a schematic view of an example wireless communication device transmitting responder directional beams during a responder transmitter sector level sweep across a responder transmitting scan range.

Referring to FIG. 4B, in some implementations, the WCD 150 executes a responder T-SLS after executing the R-SLS during the initiator T-SLS. For instance, the WCD 150 may transmit responder directional beams 492 across a responder T-SLS scan range 493 during execution of the responder T-SLS. Thereafter, the external NIU receives one or more of the responder directional beams 492 indicating the optimal initiator beam vector 480 received by the WCD 150 during the initiator T-SLS (FIG. 4A). In response to receiving the one or more responder directional beams 492 from the WCD 150, the external NIU 200 may transmit sector sweep feedback to the WCD 150 indicating an optimal responder beam vector 490 used by the WCD 150 while executing the responder T-SLS, and when the external NIU 200 receives a sector sweep acknowledgement from the WCD 150, the wireless communication link 280 is established using the optimal initiator beam vector 480 and the optimal responder beam vector 490.

Figure 5:
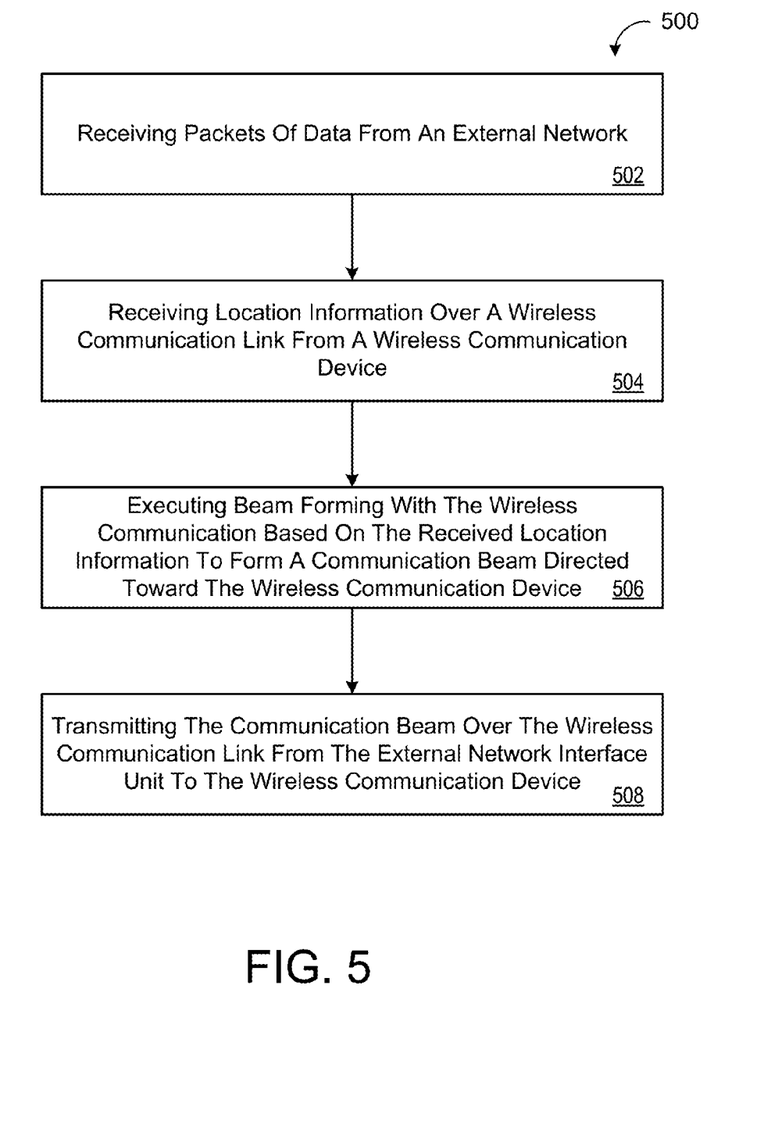
FIG. 5 is a flowchart of an example method for non-invasively establishing communication between an optical line terminal within an external network and a wireless communication device within a residential network.

FIG. 5 provides an example arrangement of operations for a method 500 of non-invasively establishing communication between an optical line terminal (OLT) 20 within an external network 102 and a wireless communication device (WCD) 150 within a residential network 104. The external network 102 may include a passive optical network (PON). At block 502, the method 500 includes receiving, at control hardware 205 of an external network interface unit (NIU) 200, packets of data 50 from the external network 102. The external NIU 200 may affix to an exterior side 142 of a surface 140 of a building 42. For instance, the external NIU 200 may affix to the exterior side 142 of a window 140 using adhesives, suction, magnets, or other attachment techniques.

In some examples, the control hardware 205 at the external NIU 200 receives the data packets 50 from an external transceiver device (TD) 90 located outside the building 42 at a demarcation point between the residential network 104 and the external network 102. The external TD 90 may route the data packets 50 from the external network 102 to the external NIU 200 via a cable 92 (e.g., Ethernet cable). The external TD 90 may include an optical network unit (ONU) having a media converter for converting an optical signal 10 from the external network 102 to an electrical signal 16 (e.g., Ethernet signal) and provide the electrical signal 16 to the NIU 200 via the cable 92. The external TD 90 may receive the optical signal 10 via a fiber line 12 or via a free space optical beam 114. A free space optical terminal 112 at an established fiber point of presence site (e.g., within a last mile 110) of the external network 102 may wirelessly transmit the downstream optical signals 10.

At block 504, the method 500 also includes, receiving, at the control hardware 205, location information 306 over a wireless communication link 280 from the WCD 150. The location information 306 may indicate a relative location/position of the WCD 150 within the building 42. For instance, the location information 306 may include a feedback matrix V built by the WCD 150 and include in a feedback frame 304 transmitted over the communication link 280 and through the surface 140 to the external NIU 200.

At block 506, the method 500 also includes executing, by the control hardware 205, beam forming with the WCD 150 based on the received location information 306 (i.e., the feedback matrix V within the feedback frame 304) to form a communication beam 380 directed toward the WCD 150.

Thereafter, the method 500 includes, at block 508, transmitting the communication beam 380 over the wireless communication link 280 from the external NIU 200 to the WCD 150. The control hardware 205 may include a multiple-input multiple-output (MIMO) antenna array 216 arranged in a 4×4 configuration. Additionally or alternatively, the control hardware 205 may include a MIMO antenna array 216 arranged in a 2×2 configuration. The communication beam 380 contains the data packets 50 from the external network 102. The WCD 150 may correspond to a router or residential gateway within the residential network 104 that is configured to route the data packets 50 to one or more electronic devices 120 associated with the a user/customer 40.

Figure 6:
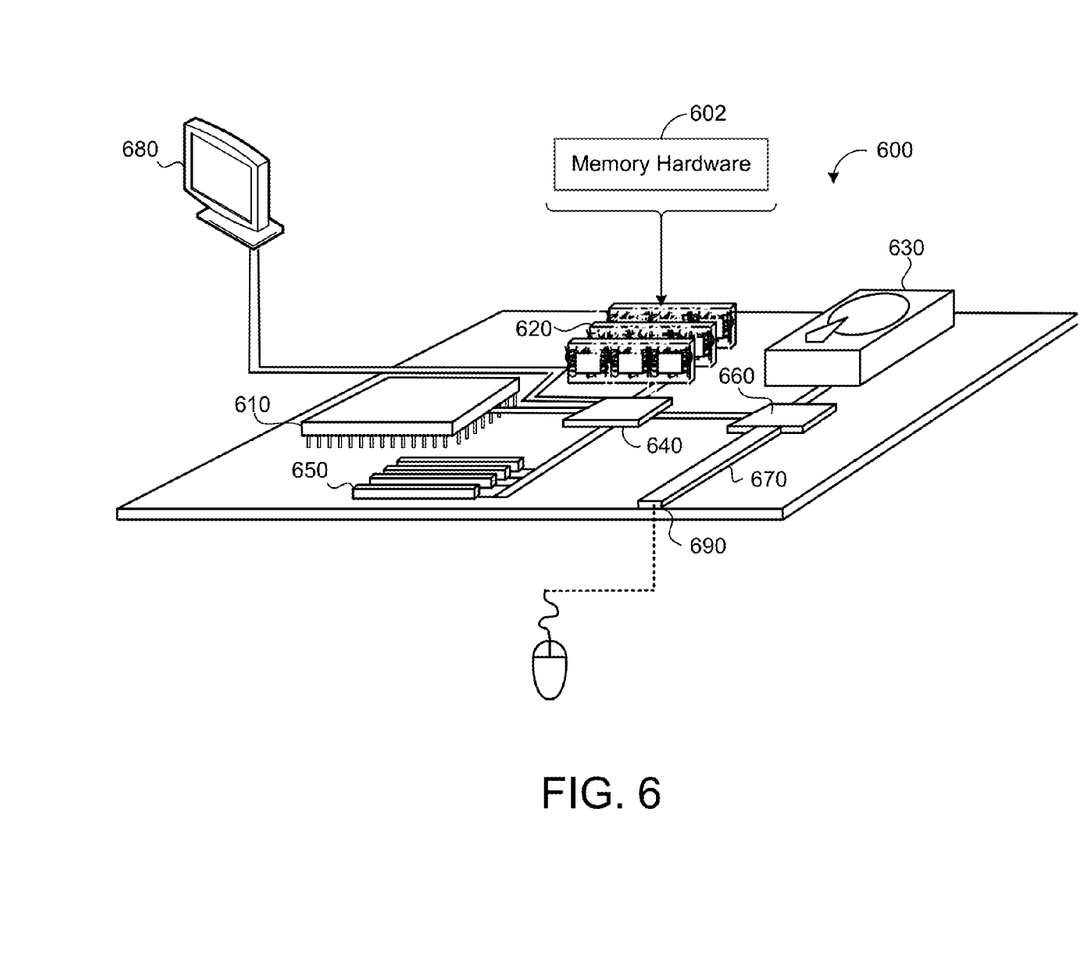
FIG. 6 is schematic view of an example computing device that may be used to implement the systems and methods described in this document.

FIG. 6 is a schematic view of an example control hardware 600 in communication with memory hardware 602 that may be used to implement the systems and methods described in this document. The control hardware 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 600 includes a processor 610, memory 620, a storage device 630, a high-speed interface/controller 640 connecting to the memory 620 and high-speed expansion ports 650, and a low speed interface/controller 660 connecting to low speed bus 660 and storage device 630. Each of the components 610, 620, 630, 640, 650, and 660, are interconnected using various busses, and may be mounted on a common motherboard or in other manners as appropriate. The processor 610 can process instructions for execution within the control hardware 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple control hardware 600 may be connected, with each device providing portions of the necessary operations (e.g., as a server bank, a group of blade servers, or a multi-processor system).

The memory 620 stores information non-transitorily within the control hardware 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the control hardware 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The control hardware 600 may be implemented in a number of different forms, as shown in the figure. For example, it may be implemented as a standard server 600*a* or multiple times in a group of such servers 600*a*, as a laptop computer 600*b*, or as part of a rack server system 600*c*. The control hardware 600 may implement the control hardware 205 of the external NIU 200 that includes the transceiver circuitry 210 and the power circuitry 240. The control hardware 600 may be in communication with the memory hardware 602.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at control hardware of an external network interface unit, data packets from an external network, the external network interface unit affixed to an external surface of a building;
   receiving, at the control hardware, location information over a wireless communication link from a wireless communication device inside the building, the location information indicating a relative location of the wireless communication device;
   executing, by the control hardware, beam forming with the wireless communication device based on the received location information to form a communication beam directed toward the wireless communication device;

transmitting the communication beam over the wireless communication link from the external network interface unit to the wireless communication device, the communication beam containing the data packets; and receiving, at the control hardware, inductive power from an internal charging device inductively coupled to the control hardware, the internal charging device located inside the building and comprising a transmit induction coil configured to generate an electromagnetic field for transmitting the inductive power through the external surface to the control hardware.

2. The method of claim 1, wherein the internal charging device is electrically connected to an alternating current power source located inside the building and affixed to an internal surface of the building in a juxtaposed relationship with the external network interface unit.

3. The method of claim 2, wherein:
the external surface of the building comprises an external side of one of a window, a wall, a door, or a facade; and
the internal surface of the building comprises an interior side of a corresponding one of the window, the wall, the door, or the facade.

4. The method of claim 1, wherein the control hardware of the external network interface unit includes power circuitry comprising:
a receive induction coil configured to receive the inductive power transmitted over the electromagnetic field by the transmit induction coil of the internal charging device; and
a rectifier configured to convert the inductive power into direct current power for powering components of the external network interface unit and/or powering customer premises equipment located outside the building.

5. The method of claim 1, wherein receiving the data packets from the external network comprises receiving the data packets from an external transceiver device in communication with the control hardware and located outside the building at a demarcation point between the building and the external network, the external transceiver device configured to route the data packets from the external network to the control hardware.

6. The method of claim 5, wherein the external transceiver device comprises an optical network unit configured to receive downstream optical signals routing the data packets from an optical line terminal of the external network and convert the upstream optical signals into electrical signals for communication to the external network interface unit.

7. The method of claim 6, wherein the optical network unit receives the optical signals through a fiber optic line terminating at the optical network unit.

8. The method of claim 5, wherein the external transceiver device communicates with the external network interface unit through a cable connected to the external transceiver device and the external network interface unit, the cable configured to route the data packets from the external transceiver device to the external network interface unit.

9. The method of claim 8, wherein the cable is further configured to provide direct current power from the external network interface unit to the external transceiver device.

10. The method of claim 1, wherein the external network interface unit comprises a multiple-input multiple-output antenna array arranged in a 4×4 configuration.

11. The method of claim 1, wherein the external network interface unit comprises a multiple input multiple-output antenna array arranged in a 2×2 configuration.

12. A method comprising:
receiving, at control hardware of an external network interface unit, data packets from an external network, the external network interface unit affixed to an external surface of a building;
receiving, at the control hardware, location information over a wireless communication link from a wireless communication device inside the building, the location information indicating a relative location of the wireless communication device;
executing, by the control hardware, beam forming with the wireless communication device based on the received location information to form a communication beam directed toward the wireless communication device; and
transmitting the communication beam over the wireless communication link from the external network interface unit to the wireless communication device, the communication beam containing the data packets,
wherein receiving the data packets from the external network comprises receiving the data packets from an external transceiver device in communication with the control hardware and located outside the building at a demarcation point between the building and the external network, the external transceiver device configured to route the data packets from the external network to the control hardware,
wherein the external transceiver device comprises an optical network unit configured to receive downstream optical signals routing the data packets from an optical line terminal of the external network and convert the upstream optical signals into electrical signals for communication to the external network interface unit, and
wherein the optical network unit receives the downstream optical signals via a free space optical beam from a free space optical terminal at an established fiber point of presence site of the external network.

13. A method comprising:
receiving, at control hardware of an external network interface unit, data packets from an external network, the external network interface unit affixed to an external surface of a building;
receiving, at the control hardware, location information over a wireless communication link from a wireless communication device inside the building, the location information indicating a relative location of the wireless communication device;
executing, by the control hardware, beam forming with the wireless communication device based on the received location information to form a communication beam directed toward the wireless communication device; and
transmitting the communication beam over the wireless communication link from the external network interface unit to the wireless communication device, the communication beam containing the data packets,
wherein executing beam forming with the wireless communication device comprises:
transmitting sounding frames through the external surface of the building from the control hardware to the wireless communication device, the wireless communication device configured to build a feedback matrix in response to receiving the sounding frames;
receiving the location information comprising the feedback matrix from the wireless communication device;

determining the relative location of the wireless communication device based on the received feedback matrix; and steering a directivity of the communication beam toward the relative location of the wireless communication device.

14. A system comprising:

an external transceiver device located at a demarcation point between an external network and a building; and an external network interface unit in communication with the external transceiver device, the external network interface unit affixed to an external surface of the building and including control hardware and memory hardware in communication with the control hardware, the memory hardware storing instructions that when executed on the control hardware cause the control hardware to perform operations comprising:

receiving data packets from an external network;

receiving location information over a wireless communication link from a wireless communication device inside the building, the location information indicating a relative location of the wireless communication device;

executing beam forming with the wireless communication device based on the received location information to form a communication beam directed toward the wireless communication device;

transmitting the communication beam over the wireless communication link from the external network interface unit to the wireless communication device, the communication beam containing the data packets; and receiving inductive power from an internal charging device inductively coupled to the control hardware, the internal charging device located inside the building and comprising a transmit induction coil configured to generate an electromagnetic field for transmitting the inductive power through the external surface to the control hardware.

15. The system of claim 14, wherein the internal charging device is electrically connected to an alternating current power source located inside the building and affixed to an interior surface of the building in a juxtaposed relationship with the external network interface unit.

16. The system of claim 15, wherein:

the external surface of the building comprises an external side of one of a window, a wall, a door, or a facade; and the internal surface of the building comprises an interior side of a corresponding one of the window, the wall, the door, or the facade.

17. The system of claim 14, wherein the control hardware of the external network interface unit includes power circuitry comprising:

a receive induction coil configured to receive the inductive power transmitted over the electromagnetic field by the transmit induction coil of the internal charging device; and a rectifier configured to convert the inductive power into direct current power for powering components of the external network interface unit and/or powering customer premises equipment located outside the building.

18. The system of claim 14, wherein receiving the data packets from the external network comprises receiving the data packets from the external transceiver device, the external transceiver device configured to route the data packets from the external network to the control hardware.

19. The system of claim 18, wherein the external transceiver device comprises an optical network unit configured to receive downstream optical signals routing the data packets from an optical line terminal of the external network and convert the upstream optical signals into electrical signals for communication to the external network interface unit.

20. The system of claim 19, wherein the optical network unit receives the optical signals through a fiber optic line terminating at the optical network unit.

21. The system of claim 18, wherein the external transceiver device communicates with the external network interface unit through a cable connected to the external transceiver device and the external network interface unit, the cable configured to route the data packets from the external transceiver device to the external network interface unit.

22. The system of claim 21, wherein the cable is further configured to provide direct current power from the external network interface unit to the external transceiver device.

23. The system of claim 14, wherein the external network interface unit comprises a multiple-input multiple-output antenna array arranged in a 4×4 configuration.

24. The system of claim 14, wherein the external network interface unit comprises a multiple input multiple-output antenna array arranged in a 2×2 configuration.

25. A system comprising:

an external transceiver device located at a demarcation point between an external network and a building; and an external network interface unit in communication with the external transceiver device, the external network interface unit affixed to an external surface of the building and including control hardware and memory hardware in communication with the control hardware, the memory hardware storing instructions that when executed on the control hardware cause the control hardware to perform operations comprising:

receiving data packets from an external network;

receiving location information over a wireless communication link from a wireless communication device inside the building, the location information indicating a relative location of the wireless communication device;

executing beam forming with the wireless communication device based on the received location information to form a communication beam directed toward the wireless communication device; and transmitting the communication beam over the wireless communication link from the external network interface unit to the wireless communication device, the communication beam containing the data packets, wherein receiving the data packets from the external network comprises receiving the data packets from the external transceiver device, the external transceiver device configured to route the data packets from the external network to the control hardware, wherein the external transceiver device comprises an optical network unit configured to receive downstream optical signals routing the data packets from an optical line terminal of the external network and convert the upstream optical signals into electrical signals for communication to the external network interface unit, and wherein the optical network unit receives the downstream optical signals via a free space optical beam from a free space optical terminal at an established fiber point of presence site of the external network.

26. A system comprising:
- an external transceiver device located at a demarcation point between an external network and a building; and
- an external network interface unit in communication with the external transceiver device, the external network interface unit affixed to an external surface of the building and including control hardware and memory hardware in communication with the control hardware, the memory hardware storing instructions that when executed on the control hardware cause the control hardware to perform operations comprising:
  - receiving data packets from an external network;
  - receiving location information over a wireless communication link from a wireless communication device inside the building, the location information indicating a relative location of the wireless communication device;
  - executing beam forming with the wireless communication device based on the received location information to form a communication beam directed toward the wireless communication device; and
  - transmitting the communication beam over the wireless communication link from the external network interface unit to the wireless communication device, the communication beam containing the data packets,
- wherein executing beam forming with the wireless communication device comprises:
  - transmitting sounding frames through the external surface of the building from the control hardware to the wireless communication device, the wireless communication device configured to build matrix data in response to receiving the sounding frames;
  - receiving the location information comprising the built matrix data from the wireless communication device;
  - determining the relative location of the wireless communication device based on the received matrix data; and
  - steering a directivity of the communication beam toward the relative location of the wireless communication device.

* * * * *